United States Patent
Bier et al.

(10) Patent No.: US 9,902,181 B2
(45) Date of Patent: Feb. 27, 2018

(54) DEVICE FOR INSCRIBING IDENTIFICATION UNITS, COMPRISING A DROP SHAFT WITH AN INCLINED CHUTE

(71) Applicant: Murrplastik Systemtechnik GmbH, Oppenweiler (DE)

(72) Inventors: Klaus-Dieter Bier, Leutenbach (DE); Marco Braeuss, Besigheim (DE); Rainer Utesch, Hamburg (DE); Stephan Briege, Norderstedt (DE)

(73) Assignee: Murrplastik Systemtechnik GmbH, Oppenweiler (DE)

( * ) Notice: Subject to any disclaimer, the term of this patent is extended or adjusted under 35 U.S.C. 154(b) by 0 days.

(21) Appl. No.: 15/500,329

(22) PCT Filed: Jul. 23, 2015

(86) PCT No.: PCT/EP2015/066843
§ 371 (c)(1),
(2) Date: Jan. 30, 2017

(87) PCT Pub. No.: WO2016/026648
PCT Pub. Date: Feb. 25, 2016

(65) Prior Publication Data
US 2017/0217236 A1    Aug. 3, 2017

(30) Foreign Application Priority Data
Aug. 18, 2014   (DE) .................. 10 2014 012 055

(51) Int. Cl.
*B41J 2/44*     (2006.01)
*B41M 5/24*    (2006.01)
(Continued)

(52) U.S. Cl.
CPC ................ *B41M 5/24* (2013.01); *B41J 2/442* (2013.01); *B41J 3/407* (2013.01); *B41J 3/50* (2013.01); *B41J 3/60* (2013.01); *B41M 5/26* (2013.01)

(58) Field of Classification Search
CPC . B41J 2/442; B41J 3/407; B41J 3/4071; B41J 13/50; B41J 13/60; B41J 13/103;
(Continued)

(56) References Cited

U.S. PATENT DOCUMENTS 3,251,593 A * 5/1966 Ried ...................... B21D 43/24
                                                     271/10.14
6,056,150 A * 5/2000 Kasper ..................... B65H 1/06
                                                        209/657
(Continued)

FOREIGN PATENT DOCUMENTS

| DE | 37 44 936 C2 | 3/1992 |
| DE | 197 26 237 A1 | 12/1998 |

(Continued)

OTHER PUBLICATIONS

International Search Report of PCT/EP2015/066843, dated Dec. 11, 2015.
(Continued)

*Primary Examiner* — Anh T. N. Vo
(74) *Attorney, Agent, or Firm* — Collard & Roe, P.C.

(57) ABSTRACT

A device for inscribing identification units, each identification unit including an identification plate or connected single-piece identification plates, each identification plate having an inscription surface, and the inscription surface or a plurality of the inscription surfaces of each identification unit spanning an inscription plane, includes a housing; an inscription device that is arranged in the housing, particularly a laser inscription device; a drop shaft which is
(Continued)

Figure 1:
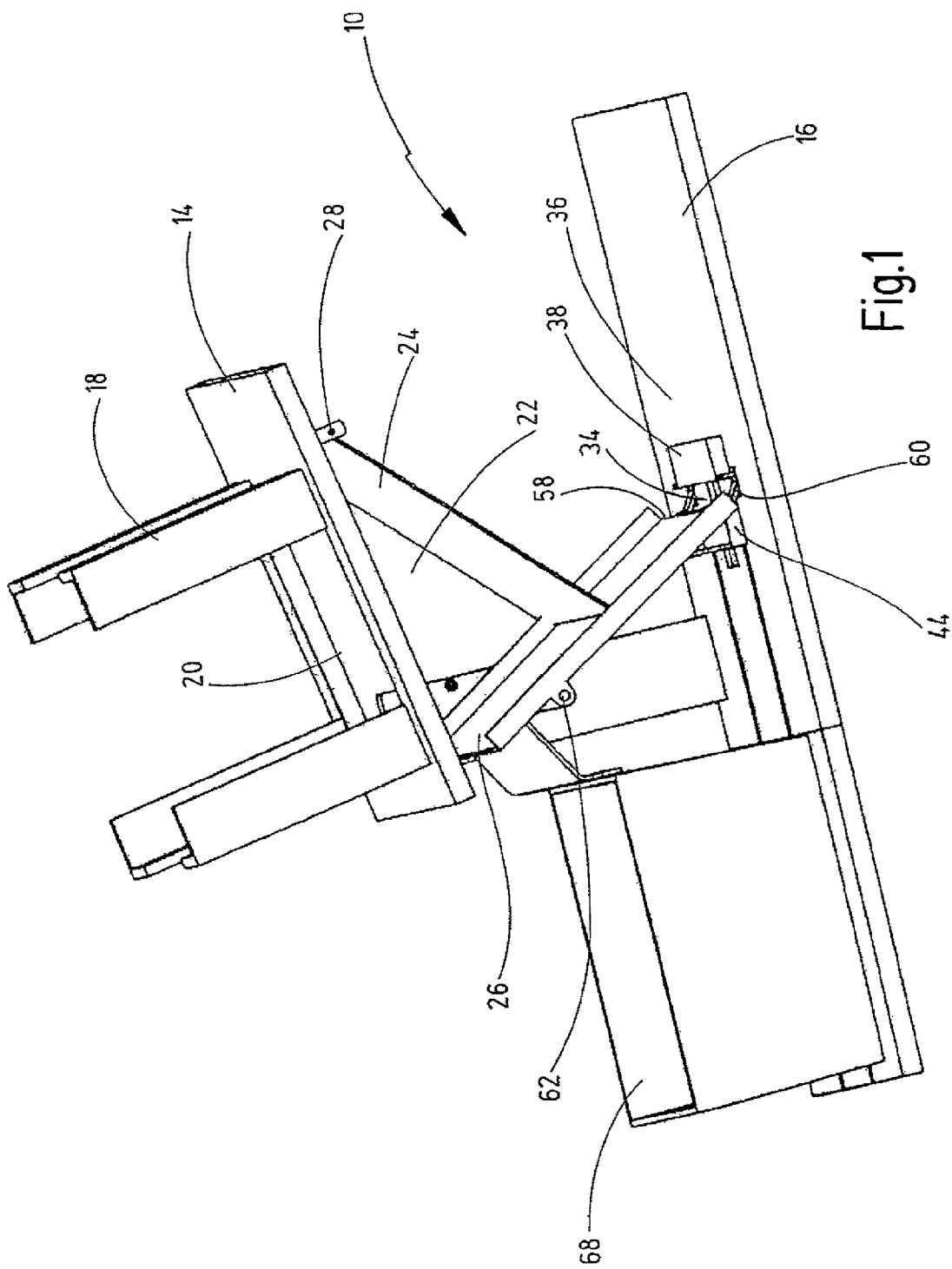

arranged in the housing, is accessible via an inlet opening in the housing, is designed for conveying individual identification units to the inscription device, and is delimited by at least one chute for the identification units, the chute being at an incline relative to the horizontal and vertical lines; a support surface which is arranged at the lower end of the drop shaft and spans a support plane in order to support an edge of the identification units; a stopping block that protrudes upwards over the support plane or is arranged over the support plane; and a counter holder that can move towards and away from the stopping block in a feed direction, in order to press identification units that are supported on the support surface against the stopping block, in an inscription position.

21 Claims, 4 Drawing Sheets

(51) Int. Cl.
*B41J 3/60* (2006.01)
*B41J 3/50* (2006.01)
*B41J 3/407* (2006.01)
*B41M 5/26* (2006.01)

(58) Field of Classification Search
CPC .......... B41J 13/12; B41M 5/24; B41M 5/245; B41M 5/26; B41M 5/38221; B41M 5/38242; B23K 26/364
See application file for complete search history.

(56) References Cited

U.S. PATENT DOCUMENTS

| | | | |
|---|---|---|---|
| 6,782,544 B2 * | 8/2004 | Russ | G11B 17/022 369/30.34 |
| 7,328,897 B2 * | 2/2008 | Bryant | B41J 3/50 235/475 |
| 7,427,003 B1 | 9/2008 | Peterson | |
| 2011/0031227 A1 | 2/2011 | Gangl et al. | |

FOREIGN PATENT DOCUMENTS

| | | |
|---|---|---|
| DE | 10 2014 004 353 A1 | 10/2015 |
| GB | 2 235 163 A | 2/1991 |
| WO | 2007/135396 A1 | 11/2007 |
| WO | 2015/144392 A1 | 10/2015 |

OTHER PUBLICATIONS

German Search Report dated Apr. 23, 2015 in German Application No. 10 2014 012 055.4 with English translation of the relevant parts.

* cited by examiner

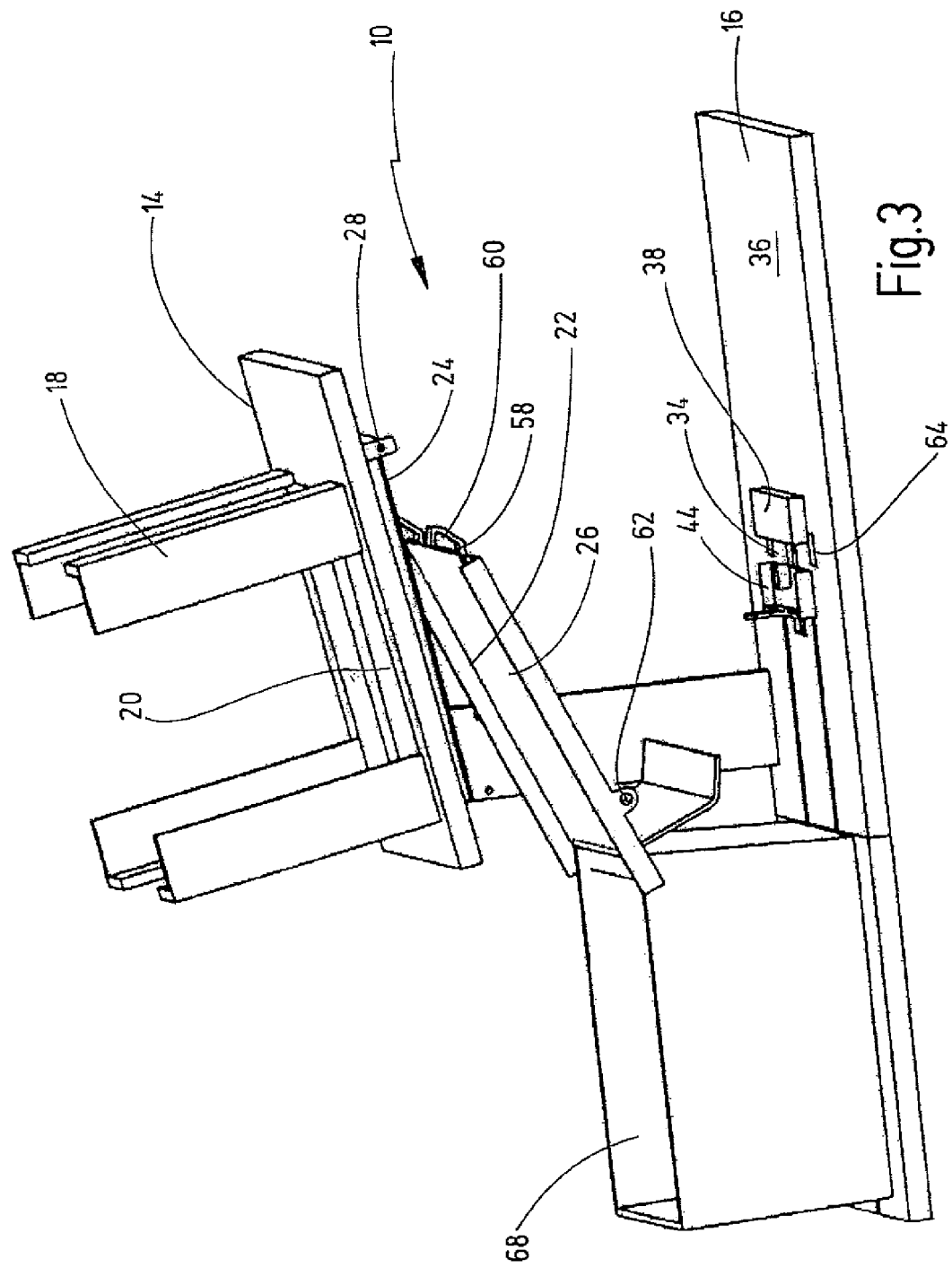

DEVICE FOR INSCRIBING IDENTIFICATION UNITS, COMPRISING A DROP SHAFT WITH AN INCLINED CHUTE

CROSS REFERENCE TO RELATED APPLICATIONS

This application is the National Stage of PCT/EP2015/066843 filed on Jul. 23, 2015, which claims priority under 35 U.S.C. §119 of German Application No. 10 2014 012 055.4 filed on Aug. 18, 2014, the disclosure of which are incorporated by reference. The international application under PCT article 21(2) was not published in English.

The invention relates to an apparatus for inscription of identification units, wherein each identification unit has an identification plate or multiple identification plates connected in one piece.

Identification plates are frequently used for identification of components. For this purpose, they have an inscription surface on which an inscription can be applied, which indicates the component to be identified. Cables, in particular, are frequently provided with identification plates, which are attached by means of grommets pushed onto the cables, for example, and carry inscriptions that identify the cables. The most varied devices are known for applying the inscription to the inscription surface that each identification plate has, for example laser printers, thermal transfer printers, plotters or engraving devices. All of them have in common that the identification plates must be brought to the inscription device. This generally takes place manually, in that the identification plates are laid onto a support surface, individually or as sets of identification plates that are connected in one piece, and inscribed there. This is complicated. If a laser printer is used, the latter must be shielded with regard to the surroundings, for reasons of work safety, in that it is disposed in a closed housing, for example, into which the identification plates to be inscribed must be laid.

It is therefore the task of the invention to develop an apparatus of the type stated initially, which allows simpler inscription of the identification plates.

This task is accomplished, according to the invention, by means of an apparatus having the characteristics of claim 1, alternatively by an apparatus having the characteristics of claim 14. Advantageous further developments of the invention are the object of the dependent claims.

The invention is based on the idea of introducing the identification units, which can have an identification plate or multiple identification plates connected in one piece, into the housing by way of the entry opening, where they slide down the chute(s) in the drop shaft and come to make contact with the support surface with an edge. Subsequently, they are pressed against the stop block, into an inscription position, by means of the counter-holder, so that they are positioned in defined manner. This positioning is particularly advantageous if a laser inscription device is used. It is then preferred that the inscription plane of an identification unit situated in the inscription position, spanned by the inscription surface(s), coincides with the focal plane of the laser inscription device.

It is practical if the stop block has a stop surface for pressing down identification units that are lying on the support surface. Pressing them down onto the stop block in planar manner increases the precision during positioning. Furthermore, it is preferred that the drop shaft is delimited by two chutes inclined in opposite directions relative to the vertical, wherein a first chute is disposed below the entry opening and extends downward at a slant toward the second chute. During the transition from the first chute to the second chute, the identification units are turned over, so that they lie against the first chute, for example, with its/their inscription surface(s), whereas the inscription surface(s) to be inscribed face(s) away from the chute during contact on the second chute. In this regard, it is possible that both chutes are disposed at a distance from one another, fixed in place on the housing, leaving a deflection part of the drop shaft free. However, it is also possible that the first chute can be pivoted back and forth about a pivot axle that runs horizontally parallel to the second chute and is fixed in place on the housing, for release and blocking of a deflection part of the drop shaft. In this regard, the second chute can be disposed fixed in place on the housing.

It is practical if the support surface is formed by multiple support ribs that run at a distance from one another and preferably run transverse to the stop surface. In the inscription position, possible injection points of the identification units can be disposed between the support ribs, so that these units do not lie on the support surface at a slant in their inscription position. Furthermore, the stop block can be produced from a transparent material, particularly Plexiglas (PMMA), so that inscription of the identification units by means of a laser inscription device can take place even through the stop block.

According to an advantageous further development, the counter-holder has a counter-holder surface that faces the stop block, as well as at least one side part that projects in the direction toward the stop block, wherein each side part, proceeding from the counter-holder surface, has a side surface that encloses an obtuse angle with the counter-holder surface, along a connection edge. By means of this measure, not only is precise positioning of the identification units with the inscription plane in the focal plane of a laser inscription device made possible, but rather also precise positioning transverse to the advancing direction of the counter-holder is made possible, in that when the identification unit is advanced to the stop block and pressed against the stop block, the identification unit slides along the side surface until it lies against the counter-holder surface and is positioned on the connection edge between the counter-holder surface and the side surface with an edge. In this regard, it is preferred that the stop surface, the counter-holder surface, and the side surface(s) run vertically, in each instance. Side parts can be provided on both sides of the counter-holder, wherein the connection edges between the counter-holder surface and the side surfaces are precisely adapted to the dimensions of the identification units. However, it is generally sufficient if a side part is disposed only on one side of the counter-holder, if the identification units are laid onto the support surface in such a manner that they come to make contact with the side part during advancing of the counter-holder.

According to an advantageous further development of the invention, the second chute is provided with a support gutter for the identification units at its lower edge, and can be tilted into a tilted position about a horizontal tilt axis fixed in place on the housing, in which position the support gutter faces upward. Tilting of the second chute then allows further transport of inscribed identification units, in that the second chute is tilted, wherein the respective identification unit lies in the support gutter with its lower edge and is entrained until the second chute is inclined in an opposite direction, so that the respective identification unit can slide down, away from the support gutter, by way of the second chute. In order not to disrupt the process of pressing the identification units against the stop block, it is practical if a depression for accommodating the support gutter is disposed in the support surface.

The alternative embodiment reproduced in claim 14 provides that the identification units slide down in the drop shaft by way of a chute and are held in an inscription position by means of a holding device. The holding device has a contact surface that is inclined relative to the horizontal, preferably disposed vertically, for planar contact of the identification units, as well as a support gutter for supporting an edge of the identification units, which follows the lower edge of the contact surface. The holding device can furthermore be tilted about a horizontal tilt axis fixed in place on the housing, into a tilted position in which the support gutter faces upward. This corresponds to an embodiment of a tiltable second chute as described above, with the difference that the support surface is not disposed to be fixed in place, but rather in the support gutter. In this regard, the support gutter can advantageously be provided, at its two ends, with slanted parts that extend toward one another in their longitudinal expanse, to a gutter bottom, so that automatic positioning of the identification units that fall into the support gutter takes place, in that these units slide down the slanted parts and are centered in the support gutters. The gutter bottom can then be adapted to the width of the identification units, in such a manner that these are positioned precisely between the ends of the slanted parts. Furthermore, an accommodation container for inscribed identification units can be provided, toward which the second chute (in the case of an embodiment according to claim 1 with a tiltable second chute) or the contact surface extends in the tilted position. The support gutter can furthermore consist of multiple sections disposed at a distance from one another, and does not have to be structured to be continuous.

In order to bring multiple identification plate sets having identification plates that are connected in one piece into the inscription position, these are preferably introduced into the drop shaft individually, by way of the entry opening, and slide down the at least one slanted plane with the inscription heads going first, until they lie on the support surface with the inscription heads. In order to introduce the identification units into the drop shaft individually, the apparatus according to the invention can have a pusher arrangement as described in the older but not yet published application DE 10 2014 004 353.3; in this connection, explicit reference is made to the disclosure content of this document. Furthermore, the height of the stop block can be adapted to the size of the inscription heads of the identification plate sets, in such a manner that the inscription heads of an identification plate set situated in the inscription position project upward beyond an upper end of the stop block, so that at most, the inscription heads are covered by the stop block.

Figure 2:
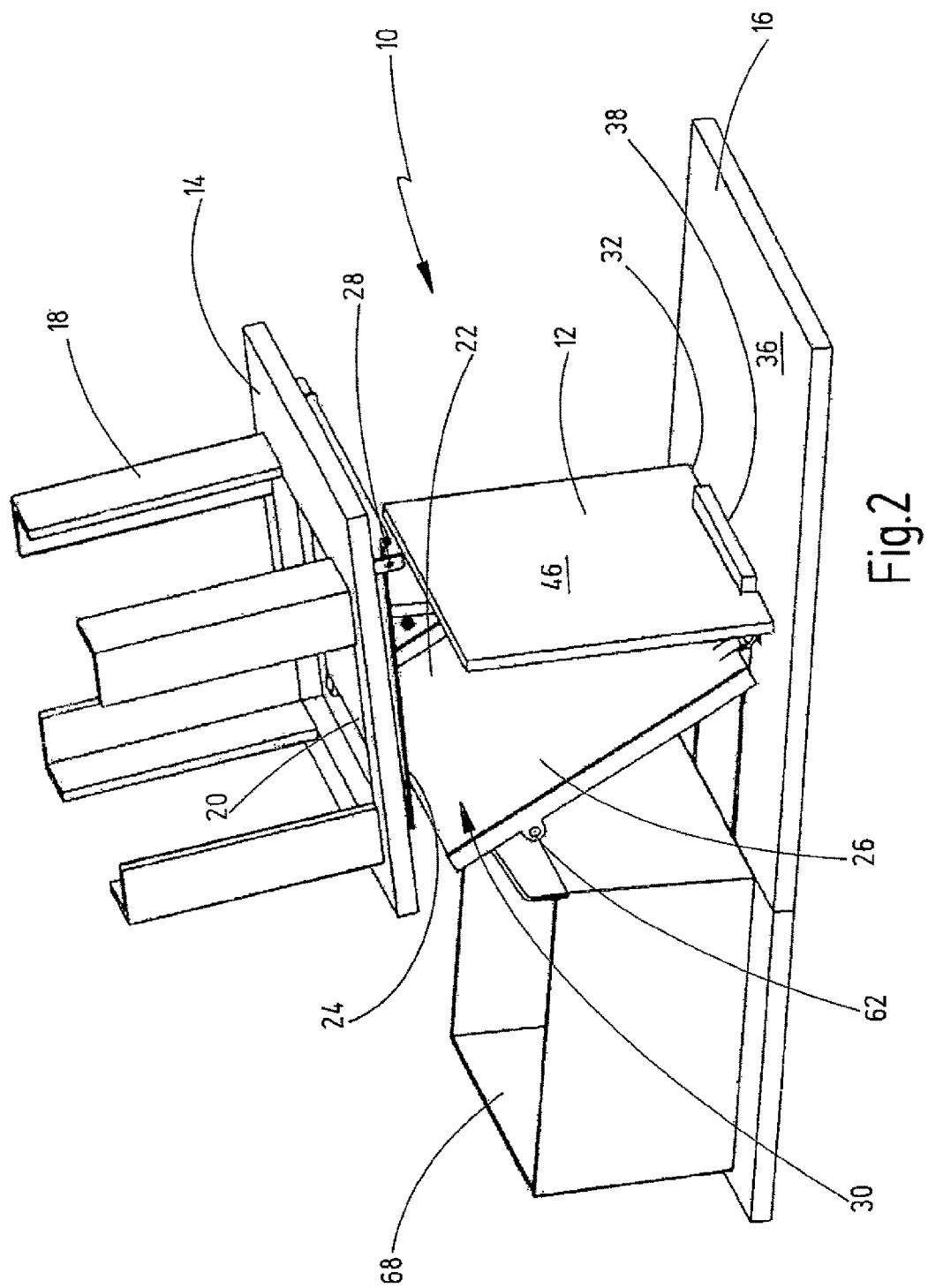
Figure 4A:
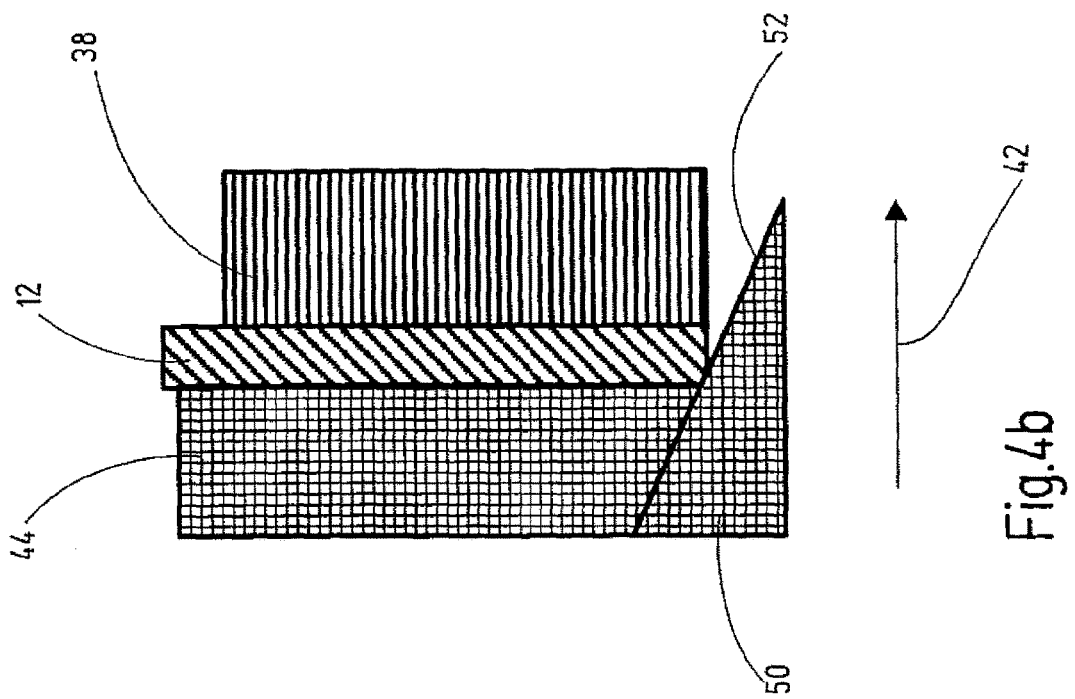
Figure 4B:
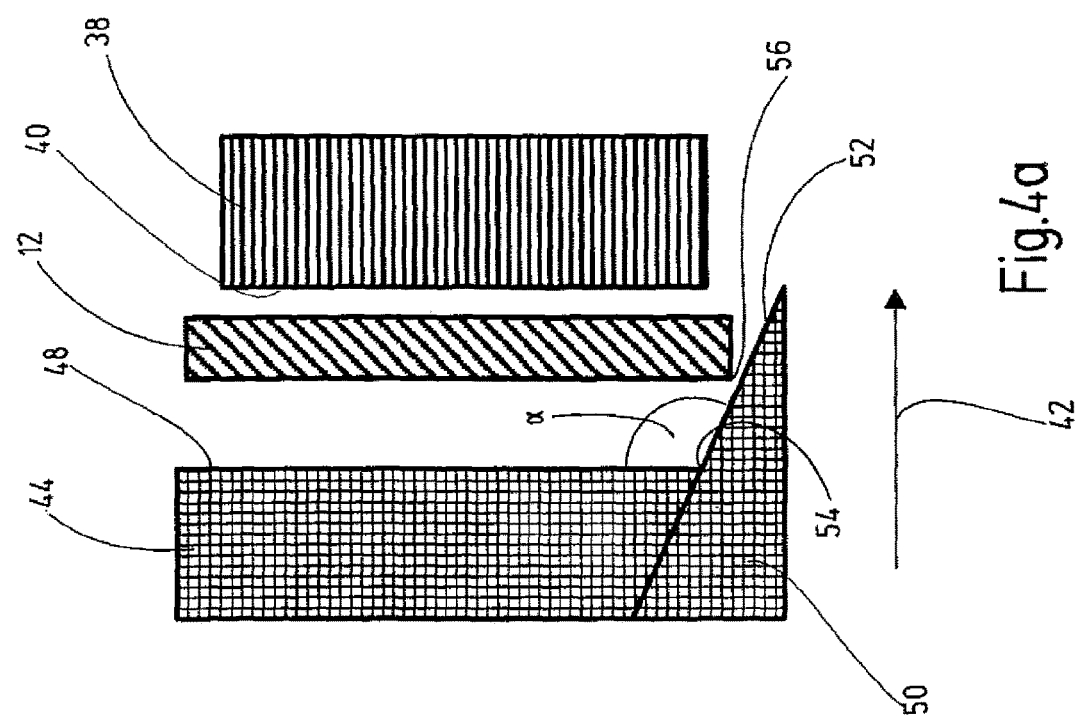

In the following, the invention will be explained in greater detail using an exemplary embodiment shown schematically in the drawing. The figures show:

FIG. 1 a schematic representation of an inscription apparatus in a perspective view;

FIG. 2 the inscription apparatus according to FIG. 1 with an identification unit in the inscription position;

FIG. 3 the inscription apparatus according to FIG. 1 with the second chute in the tilted position, and FIG. 4a, 4b a representation of the principle of pressing an identification unit down against the stop block, by means of the counter-holder, in a top view.

The inscription apparatus 10 shown schematically in FIGS. 1 to 3 serves for inscription of identification units, wherein an identification unit 12 is shown as an example in FIG. 2, which unit is represented as a one-piece plate for the sake of simplicity of the representation. The inscription apparatus 10 has a housing, of which only part of a ceiling wall 14 and a bottom wall 16 are shown, for the sake of simplicity, and in which a laser inscription device, not shown in any detail in the drawing, is accommodated and enclosed, to prevent laser light from exiting. A magazine 18 for accommodating non-inscribed identification units 12 is disposed on the ceiling wall 14, under which magazine the ceiling wall 14 has an entry opening 20, by way of which the identification units 12 can be individually brought to a drop shaft 22, particularly as described in the older application DE 10 2014 004 353.3. The drop shaft 22 is delimited by a first chute 24 disposed below the entry opening 20, as well as a second chute 26, which chutes are inclined both relative to the horizontal and relative to the vertical, in each instance. In this regard, the first chute 24 runs toward the second chute 26. The inclination relative to the vertical is opposite for the chutes 24, 26, so that in the perspective shown in FIG. 1, an identification unit 12 slides down the first chute 24 toward the left, and down the second chute 26 toward the right.

In the embodiment shown in the drawing, there is not enough space between the two chutes 24, 26, when the first chute 24 is in the position shown in FIG. 1, to allow the identification units 12 to pass through. For this purpose, the first chute 24 can be pivoted upward about a pivot axle 28 fixed in place on the housing, as shown in FIG. 2, so that a deflection part 30 of the drop shaft 22 is released and the identification unit 12 in question is transferred to the second chute 26, on which it slides down until its lower edge 32 lies on a support surface 34, which spans a support plane 36. A stop block 38 having a stop surface 40 that runs vertically projects out of the support plane 36, which block forms a delimitation of the support surface 34 in an advancing direction 42. Furthermore, a counter-holder 44 is provided, which can be moved toward the stop block 38 in the advancing direction 42, and away from it in the opposite direction. The counter-holder 44 serves for pressing identification units 12 that lie on the support surface 34 against the stop surface 40 and fixing them in place in the inscription position defined in this way and shown in FIG. 2, in which position an inscription plane 46 spanned by an inscription surface of the identification unit 12, which surface serves for applying an inscription by means of the laser inscription device, coincides with the focal plane of the laser inscription device.

At this point, it should be noted that although the identification unit 12 shown in FIG. 2 is shown as a plate, for the sake of simplicity, in general identification units that have multiple identification plates connected in one piece are to be inscribed. In general, such identification plate sets furthermore have inscription heads connected in one piece with the identification plates, which heads preferably are laid onto the support surface 34 and fixed in place between the stop block 38 and the counter-holder 44. The inscription plane 46 is then spanned by the surfaces of the identification plates to be inscribed and, if applicable, the inscription heads. A typical identification plate set of the applicant is described in DE 37 44 936 C2, to which reference is made in this connection, and in which the inscription heads are referred to as "small plates."

The counter-holder 44 has a counter-holder surface 48 that faces the stop surface 40 and runs parallel to it, for one thing. It furthermore has a side part 50 that narrows in the direction toward the stop block 38 and has a side surface 52 that is connected with the counter-holder surface 48 along a connection edge 54 and encloses an obtuse angle α with the latter. When the counter-holder 44 is moved in the advancing direction 42, toward the stop block 38, a side edge 56 of the identification unit 12 makes contact with the side surface 52 and slides down on it until it makes contact with the connection edge 54, as shown in FIG. 4b. In this manner, the identification unit is precisely positioned in all spatial directions, by means of resting on the support surface 34, making contact with the stop surface 40, and making contact with the connection edge 54, so that it can be inscribed by the laser inscription device with great precision.

The second chute 26 is provided with a support gutter 60 at its lower edge 58, and furthermore can be tilted about a tilt axle 62 that runs horizontally and is fixed in place on the housing, from the position shown in FIG. 2, in which the support gutter 60 dips into a depression 64 in the support surface 34, into a tilted position shown in FIG. 3, in which the support gutter 60 faces upward. In the tilted position, the second chute 26 is inclined in the opposite direction relative to the vertical, so that an identification unit 12 that lies on it can slide down away from the support gutter 60. In the tilted position, the second chute 26 furthermore runs toward an accommodation container 68 that is intended for accommodating inscribed identification units 12. In this regard, the support gutter 60 prevents the identification unit 12 that lies on the second chute 26 from sliding down in the wrong direction during the tilting process, in other words toward the stop surface 34.

According to an alternative embodiment, not shown in a drawing, the support surface 34 can be formed by a bottom of the support gutter 60. Positioning along the lower edge 32 of the identification unit 12 can take place in that the support gutter 60, at its two ends, is provided with slanted parts that extend downward toward a gutter bottom, on which parts the identification unit 12 can slide until it lies on the gutter bottom in the support gutter 60, which is adapted to its dimensions. By means of this measure, as well, the identification unit 12 is positioned in defined manner and can be inscribed by means of the laser inscription device, without a stop block and a counter-holder being required, as in the exemplary embodiment shown in the drawing.

In summary, the following should be stated: The invention relates to an apparatus 10 for inscription of identification units 12, wherein each identification unit 12 has an identification plate or multiple identification plates connected in one piece, wherein each identification plate has an inscription surface and wherein the inscription surface or multiple inscription surfaces of each identification unit 12 span(s) an inscription plane 46, having a housing 14, 16, with an inscription device disposed in the housing 14, 16, particularly a laser inscription device, having a drop shaft 22 for transport of individual identification units 12 to the inscription device, which shaft is disposed in the housing 14, 16 and is accessible by way of an entry opening 20 in the housing 14, and is delimited by means of at least one chute 24, 26 for the identification units 12 that is inclined relative to the horizontal and relative to the vertical, having a support surface 34 that spans a support plane 36, disposed at the lower end of the drop shaft 22, onto which surface an edge 32 of the identification units 12 is to be laid, having a stop block 38 that projects upward beyond the support plane 36 or is disposed above the support plane 36, and having a counter-holder 44 that can be moved toward the stop block 38 in an advancing direction 42 and away from the block, for pressing identification units 12 that lie on the support surface 34 against the stop block 38 in an inscription position.

REFERENCE SYMBOL LIST 10 inscription apparatus
12 identification unit
14 ceiling wall
16 bottom wall
18 magazine
20 entry opening
22 drop shaft
24 first chute
26 second chute
28 pivot axle
30 deflection part
32 lower edge
34 support surface
36 support plane
38 stop block
40 stop surface
42 advancing direction
44 counter-holder
46 inscription plane
48 counter-holder surface
50 side part
52 side surface
54 connection edge
56 side edge
58 lower edge
60 support gutter
62 tilt axle
64 depression
68 accommodation container

The invention claimed is:

1. An apparatus for inscription of identification units (12), wherein each identification unit (12) of the identification units at second occurrence has an identification plate or multiple identification plates connected in one piece, wherein each identification plate has an inscription surface and wherein the inscription surface or multiple inscription surfaces of each identification unit (12) span(s) an inscription plane (46), the apparatus comprising:

a housing (14, 16), with an inscription device disposed in the housing (14, 16), particularly a laser inscription device, a drop shaft (22) for transport of individual identification units (12) to the inscription device, wherein the drop shaft is disposed in the housing (14, 16) and accessible by way of an entry opening (20) in the housing (14), and is delimited by means of at least one chute (24, 26) for the identification units (12) that is inclined relative to the horizontal and relative to the vertical, a support surface (34) that spans a support plane (36), disposed at the lower end of the drop shaft (22), onto which surface an edge (32) of the identification units (12) is to be laid, a stop block (38) that projects upward beyond the support plane (36) or is disposed above the support plane (36), and a counter-holder (44) that can be moved toward the stop block (38) in an advancing direction (42) and away from the block, for pressing identification units (12) that lie on the support surface (34) against the stop block (38) in an inscription position.

2. The apparatus according to claim 1, wherein the stop block (38) has a stop surface (40) for pressing down identification units (12) that lie on the support surface (34).

3. The apparatus according to claim 1, wherein the drop shaft (22) is delimited by two chutes (24, 26) that are inclined relative to the vertical in opposite directions, wherein a first chute (24) is disposed below the entry opening (20) and extends downward at a slant toward the second chute (26).

4. The apparatus according to claim 3, wherein the two chutes (24, 26) are disposed at a distance from one another, fixed in place on the housing, leaving a deflection part (30) of the drop shaft (22) free.

5. The apparatus according to claim 3, wherein the first chute (24) can be pivoted back and forth about a pivot axle (28) that runs horizontally parallel to the second chute (26), which pivot axle (28) is preferably fixed in place on the housing, for release and blocking of a deflection part (30) of the drop shaft (22).

6. The apparatus according to claim 1, wherein the support surface (34) is formed by multiple support ribs that run at a distance from one another and preferably run transverse to the stop surface (40).

7. The apparatus according to claim 1, wherein the inscription plane (46) of an identification unit (12) situated in the inscription position coincides with the focal plane of the laser inscription device.

8. The apparatus according to claim 1, wherein the stop block (38) is produced from a transparent material, particularly Plexiglas (PMMA).

9. The apparatus according to claim 1, wherein the counter-holder (44) has a counter-holder surface (48) that faces the stop block (38), as well as at least one side part (50) that projects in the direction toward the stop block (38), wherein each side part (50), proceeding from the counter-holder surface (48), has a side surface (52) that encloses an obtuse angle (α) with the counter-holder surface (48), along a connection edge (54).

10. The apparatus according to claim 2, wherein the stop surface (40), the counter-holder surface (48), and the side surface(s) (52) run vertically, in each instance.

11. The apparatus according to claim 3, wherein the second chute (26) is provided with a support gutter (60) at its lower edge (58) for the identification units (12), and can be tilted about a tilt axle (62) that runs horizontally and is fixed in place on the housing, into a tilted position in which the support gutter (60) faces upward.

12. The apparatus according to claim 11, wherein a depression (64) for accommodating the support gutter (60) is disposed in the support surface (34).

13. The apparatus according to claim 11, wherein the support surface (34) is disposed in the support gutter (60).

14. An apparatus for inscription of identification units (12), wherein each identification unit (12) of the identification units at second occurrence has an identification plate or multiple identification plates connected in one piece, wherein each identification plate has an inscription surface and wherein the inscription surface or multiple inscription surfaces of each identification unit (12) span(s) an inscription plane (46), the apparatus comprising:
a housing (14, 16), with an inscription device disposed in the housing (14, 16), particularly a laser inscription device,
a drop shaft (22) for transport of individual identification units (12) to the inscription device, wherein the drop shaft is disposed in the housing (14, 16) and accessible by way of an entry opening (20) in the housing (14), and is delimited by means of at least one chute (24) that is inclined relative to the horizontal and relative to the vertical, and
a holding device for holding the identification units (12) in an inscription position, which device has a contact surface that is inclined relative to the horizontal, for planar contact of the identification units (12), and a support gutter for supporting an edge (32) of the identification units (12), which follows the lower edge of the contact surface,
wherein the at least one chute (24) extends toward the contact surface, and
wherein the holding device can be tilted about a horizontal tilt axis fixed in place on the housing, into a tilted position in which the support gutter faces upward.

15. The apparatus according to claim 13, wherein the support gutter (60) is provided, at its two ends, with slanted parts that extend toward one another in their longitudinal expanse, to a gutter bottom.

16. The apparatus according to claim 11, wherein the support gutter (60) comprises multiple sections disposed at a distance from one another.

17. The apparatus according to claim 11, further comprising an accommodation container (68) for inscribed identification units (12), toward which the second chute (26) or the contact surface extends in the tilted position.

18. Method for inscription of identification plate sets, using an apparatus according to claim 1, wherein each identification plate set (12) has a plurality of identification plates that are connected in one piece, as well as multiple inscription heads connected with the identification plates in one piece, disposed in a row at a distance from one another, wherein the identification plates and the inscription heads have an inscription surface, in each instance, and wherein the inscription surfaces of each identification plate set (12) span an inscription plane (46), wherein the identification plate sets (12) are individually introduced into the drop shaft (22) by way of the entry opening (20) and slide down the at least one chute (24, 26) with the inscription heads going first, until they lie on the support surface (34) with the inscription heads, wherein identification plate sets (12) that lie on the support surface (34) are pressed against the stop block (38), into an inscription position, by means of the counter-holder (44), with the inscription surfaces facing the stop block (38), and are inscribed by means of the inscription device.

19. Method according to claim 18, wherein the identification plate sets (12) are turned during the transition from the first chute (24) to the second chute (26), so that the inscription surfaces lie on the first chute (24) and face away from the second chute (26).

20. Method according to claim 18, wherein the height of the stop block (38) is adapted to the size of the inscription heads in such a manner that the inscription heads of an identification plate set (12) situated in the inscription position project upward beyond an upper end of the stop block (38).

21. Method according to claim 18, wherein in the inscription position, injection points that project downward from the inscription heads are positioned between two support ribs, in each instance.

* * * * *

UNITED STATES PATENT AND TRADEMARK OFFICE
CERTIFICATE OF CORRECTION

PATENT NO. : 9,902,181 B2
APPLICATION NO. : 15/500329
DATED : February 27, 2018
INVENTOR(S) : Klaus-Dieter Bier et al.

It is certified that error appears in the above-identified patent and that said Letters Patent is hereby corrected as shown below:

In Column 6, Line 31, (Line 3 of Claim 1) please delete the words "at second occurrence".

In Column 7, Line 46, (Line 3 of Claim 14) please delete the words "at second occurrence".

Signed and Sealed this
Twenty-second Day of May, 2018

Andrei Iancu
*Director of the United States Patent and Trademark Office*